US006506347B1

(12) United States Patent
Jackson

(10) Patent No.: US 6,506,347 B1
(45) Date of Patent: *Jan. 14, 2003

(54) OPEN SYSTEM SULPHUROUS ACID GENERATOR

(75) Inventor: Edward W. Jackson, Salt Lake City, UT (US)

(73) Assignee: AAPA Trust, Salt Lake City, UT (US)

( * ) Notice: Subject to any disclaimer, the term of this patent is extended or adjusted under 35 U.S.C. 154(b) by 254 days.

This patent is subject to a terminal disclaimer.

(21) Appl. No.: 09/643,097

(22) Filed: Aug. 21, 2000

Related U.S. Application Data

(63) Continuation-in-part of application No. 08/888,376, filed on Jul. 7, 1997, now Pat. No. 6,248,299.

(51) Int. Cl.[7] .......................... C01B 17/48; B32B 9/04; B32B 5/02; B32B 27/42
(52) U.S. Cl. ...................... 422/161; 422/160; 422/169; 422/172; 422/189; 423/522
(58) Field of Search ................. 422/160, 161; 241/5

(56) References Cited

U.S. PATENT DOCUMENTS

| | | | |
|---|---|---|---|
| 353,222 A | 11/1886 | Hughes | |
| 1,865,607 A | 7/1932 | Allen | |
| 3,226,201 A | 12/1965 | Harmon | 23/262 |
| 3,227,201 A | 1/1966 | Pokorny | 158/7 |
| 3,314,766 A | 4/1967 | Mukherji | 23/278 |
| 3,337,989 A | 8/1967 | Harmon | 47/58 |
| 3,409,409 A | 11/1968 | Sackett, Sr. | 23/283 |
| 3,627,134 A | 12/1971 | Mattson | 210/192 |
| 3,723,068 A | 3/1973 | McBroy | 23/262 |
| 3,907,510 A | 9/1975 | Collins | 23/278 |
| 4,039,289 A | 8/1977 | Collins | 23/262 |
| 4,526,771 A | 7/1985 | Forbush | 423/543 |
| 4,747,970 A | 5/1988 | McFarland | 261/96 |
| 4,966,757 A | 10/1990 | Lewis | 422/62 |
| 5,032,373 A | 7/1991 | Jones et al. | 423/522 |
| 5,598,979 A * | 2/1997 | Rowley, Jr. | 241/5 |

OTHER PUBLICATIONS

G.A. Cain and J.B. Chatelain, "New Low Capacity Sulphur Burner," *Chemical & Metallurgical Engineering*, vol. 46 No. 10, p 637–39, Oct. 1939.
Harmon $SO_2$ Generators: Care and Maintenance.

* cited by examiner

*Primary Examiner*—Marian C. Knode
*Assistant Examiner*—Douglas W. Rudnick
(74) *Attorney, Agent, or Firm*—Kirton & McConkie; Todd E. Zenger

(57) ABSTRACT

This invention presents a sulphurous acid generator which employs a combination of novel blending, contact and mixing mechanisms which maximize the efficiency and duration of contact between sulphur dioxide gas and water to form sulphurous acid in an open nonpressurized system, without employing a countercurrent absorption tower. The present invention also incorporates a novel high temperature concrete for use in constructing portions of the present invention.

8 Claims, 10 Drawing Sheets

OPEN SYSTEM SULPHUROUS ACID GENERATOR

RELATED APPLICATION

This application is a continuation-in-part of patent application Ser. No. 08/888,376 now U.S Pat. No. 6,248,299 filing date Jul. 7, 1997.

BACKGROUND OF THE INVENTION

THE FIELD OF THE INVENTION

Only a fraction of the earth's total water supply is available and suitable for agriculture, industry and domestic needs. The demand for water is great and new technologies together with growing populations increase the demand for water while pollution diminishes the limited supply of usable water. The growing demand for water requires efficient use of available water resources.

Agricultural use of water places a large demand on the world's water supply. In some communities, the water supply may be adequate for farming but the quality of the water is unsuitable for agriculture because the water is alkaline. Alkalinity is an important factor affecting the quality, efficiency and performance of soil and irrigation water. A relative increase in irrigation alkalinity due to the water's sodium to calcium ratio or a high pH renders irrigation water detrimental to soil, crop growth and irrigation water efficiency. Such water can be reclaimed for soil rehabilitation and irrigation by adding lower pH sulphurous acid to the alkaline water to reduce its alkalinity or pH.

The invention of this application is directed toward a device which generates sulphurous acid in a simplified, efficient way. In particular, it is directed toward a sulphurous acid generator which produces sulphurous acid by burning sulphur to produce sulphur dioxide gas. The sulphur dioxide gas is then drawn toward and held in contact with water eventually reacting with the water and producing sulphurous acid, while substantially reducing dangerous emissions of sulphur dioxide gas to the air.

THE RELEVANT TECHNOLOGY

There are several sulphurous acid generators in the art. The prior art devices utilize sulphur burn chambers and absorption towers. However, known systems utilize countercurrent current flow or pressurized systems as the principle means to accomplish the generation of sulphurous acid. For example, many devices employ the absorption tower to introduce the majority of the water to the system in countercurrent flow to the flow of sulphur dioxide gas. U.S. Pat. No. 4,526,771 teaches introducing 90% of the system water for the first time in countercurrent flow at the top of the absorption tower. In such devices, the integrity of the absorption towers is vital, and any deficiencies or inefficiencies of the absorption tower lead to diminished reaction and results. Other devices utilize pressurized gas to facilitate flow of gas through the system, see U.S. Pat. No. 3,226,201. Pressurized devices, however, require expensive manufacture to ensure the containment of dangerous sulphur dioxide gas to avoid leakage. Even negative pressure machines have the drawback of requiring a source of energy to power the negative pressure generator such as an exhaust fan. Still other devices rely upon secondary combustion chambers to further oxidize the sulphur, see U.S. Pat. No. 4,526,771. Many sulphurous acid generators emit significant or dangerous levels of unreacted sulphur dioxide gas, a harmful and noxious pollutant, into the surrounding environment.

SUMMARY AND OBJECTS OF THE INVENTION

The present invention is directed to a sulphurous acid generator which can be used to improve alkaline irrigation water by adding the sulphurous acid produced by the generator to alkaline water to reduce the alkalinity and/or pH of the water. In addition to making the water less alkaline, adding sulphurous acid to alkaline water increases the availability of sulphur in the water to act as a nutrient, improves capillary action of the soil, increases cation exchange capacity, and decreases tail water run-off and tillage and fertilizer costs.

In many agricultural settings, complicated farm machinery is not practical because it requires technical training to operate and special skills to service and maintain. For sulphur generators, improved design can reduce costs, simplify operation, service and maintenance and increase efficiency and safety thereby making the machine more practical for agricultural use. The present invention is directed toward a sulphurous acid generator that is simple to produce, operate, service and maintain, and which efficiency produces, contains and reacts sulphur dioxide gas and sulphurous acid without exposing the user or other living things in proximity to the machine to dangerous sulphur dioxide emissions.

It will be appreciated that a specific energy source is not necessarily required by the present invention, and therefore its use is not necessarily restricted to locations where a particular power source, like electricity, is available or can be generated for use. All of the above objectives are met by the present invention.

Unlike the prior art, the present invention is designed to maximize the amount of water in contact with sulphur dioxide gas and the duration of the contact of water with sulphur dioxide gas without creating or minimizing back pressure in the system or relying upon pressurization of the gas to cause the sulphur dioxide gas to flow through the sulphurous acid generator. This reduces the complexity of the sulphurous acid generator and the need for additional equipment such as air compressors used by prior art devices.

The invention primarily relates to a sulphur hopper, a burn chamber, a gas pipeline, a mixing tank, an exhaust pipeline, and an exhaust scrubbing tower.

The sulphur hopper preferably has a capacity of several hundred pounds of sulphur in powder, flake, split-pea or pastile form. The sulphur hopper can be constructed of various materials or combinations thereof. In one embodiment, the sulphur hopper is constructed of stainless steel and plastic. In the preferred embodiment the hopper is constructed of Saggregate™ concrete. The sulphur hopper is connected to the burn chamber by a passageway positioned at the base of the sulphur hopper. The conduit joins the burn chamber at its base. The weight of the sulphur in the sulphur hopper forces sulphur through the passageway at the base and into the burn chamber, providing a continual supply of sulphur for burning.

A cooling ring is disposed at the base of the hopper. The cooling ring enters the base of the hopper, traverses a unshaped pattern near the passageway into the burn chamber protruding above the base of the hopper. The cooling ring creates a physical and temperature barrier preventing molten sulphur from flowing across the entire base of the hopper.

The burn chamber has an ignition inlet on the top of the burn chamber through which the sulphur is ignited and an air inlet on the side of the chamber through which oxygen enters to fuel the burning sulphur. The burning sulphur generates sulphur dioxide gas. In the preferred embodiment, the top of the chamber is removable, facilitating access to the chamber for maintenance and service. The burn chamber is constructed of material capable of withstanding the corrosiveness of the sulphur and the heat of combustion, namely stainless steel but preferably Saggregate™ concrete. Saggregate™ concrete is preferred because it significantly decreases the cost of the hopper and burning chamber. Saggregate™ concrete is a unique blend of cement and aggregates.

Sulphur dioxide gas exits the burn chamber through an exhaust outlet on the top of the burn chamber and is drawn into a first conduit. The first conduit may be manufactured from stainless steel.

A supply of water is conducted by a second conduit and may be brought from a water source through the second conduit by any means capable of delivering sufficient water and pressure, such as an elevated water tank or a mechanical or electric pump.

The first conduit and second conduit meet and couple with a third conduit. The third conduit may comprise a blending portion, a contact containment portion, an agitation portion and a means for discharging the sulphurous acid and unreacted sulphur dioxide gas. In the third conduit, the sulphur dioxide gas and water are brought in contact with each other to form sulphurous acid. The third conduit may be constructed of polyethylene plastic, pvc or any durable plastic.

The blending portion of the third conduit comprises a means for bringing the sulphur dioxide gas in the first conduit and the water in the second conduit into contained, codirectional flow into contact with each other. The majority of water used to create sulphurous acid in the system and method is introduced into the third conduit and flows through one or more mixing portions in the third conduit, thereafter discharging naturally by gravity into a mixing tank.

Water is introduced into the third conduit in codirectional flow with the sulphur dioxide gas so as to create an annular column of water with the sulphur dioxide gas flowing inside the annular column of water thereby blending the water and sulphur dioxide gas together. In the preferred embodiment, water is introduced into the gas pipeline and passes through an eductor or venturi, which causes sulphur dioxide gas to be drawn through the first conduit without the need of pressuring the sulphur dioxide gas and without using an exhaust fan. The water and sulphur dioxide gas remain in contact with each other for the period of time it takes to flow through a portion of the third conduit. In the contact area, a portion of the sulphur dioxide gas reacts with the water, creating sulphurous acid.

In different embodiments, an agitation portion comprises a means for mixing and agitating the codirectionally flowing sulphur dioxide gas and water/sulphurous acid. The agitation portions enhance sulphur dioxide gas reaction and dispersion. Bends in or a length of the third conduit or obstructions within the third conduit are contemplated as means for mixing and agitating in the agitation portion. Agitation of the codirectional flow of the sulphur dioxide gas and water further facilitates reaction of the sulphur dioxide gas with water. Sulphurous acid and sulphur dioxide gas flow out of the third conduit through means for discharging the sulphurous acid and unreacted sulphur dioxide gas.

A discharge outlet represents a possible embodiment of means for discharging the sulphurous acid and unreacted sulphur dioxide gas. The discharge outlet permits conduit contents to enter a gas submersion zone.

The sulphurous acid and unreacted sulphur dioxide gas exit the third conduit through the discharge and enter a gas submersion zone or mixing tank. In one embodiment, a weir divides the mixing tank into two sections, namely a pooling section and an effluent or outlet section. Sulphurous acid and sulphur dioxide gas exit the discharge of the third conduit into the pooling section. As the sulphurous acid pours into the mixing tank, it creates a pool of sulphurous acid equal in depth to the height of the weir. At all times, the water/acid and unreacted sulphur dioxide gas discharge from the third conduit above the level of the liquid in the pooling section of the mixing tank. In another embodiment, water/acid and unreacted sulphur dioxide gas discharge from the third conduit to mix in a single cell mixing tank, discharging out the bottom of the mixing tank.

In other words, the discharge from the third conduit is positioned sufficiently high in the mixing tank so that sulphur dioxide gas exiting the pipeline can pass directly into and be submerged within the pool while in an open (nonclosed) arrangement. In other words, the discharge from the third conduit does not create any significant back pressure on the flow of sulphurous acid or sulphur dioxide gas in the third conduit or gas pipeline. Nevertheless, the vertical position of the discharge from the third conduit into the pool reduces the likelihood that the unreacted sulphur dioxide gas will exit from the discharge without being submerged in the pool. In one embodiment, the discharge is removed a distance from the sidewall of the mixing tank toward the center of the pooling section to allow the pool to be efficiently churned by the inflow of sulphurous acid and unreacted sulphur dioxide gas from the third conduit. In another embodiment, discharge out the bottom of the mixing tank upstream from a u-trap efficiently churns unreacted sulphur dioxide gas with the aqueous fluid of the system.

As acidic/water and gas continue to enter the mixing tank from the third conduit in one embodiment, the level of the pool eventually exceeds the height of the weir. Sulphurous acid spills over the weir and into the effluent or outlet section of the mixing tank where the sulphurous acid exits the mixing tank through an effluent outlet. The top of the effluent outlet is positioned below height of the weir and below the discharge from the third conduit in order to reduce the amount of free floating unreacted sulphur dioxide gas exiting the chamber through the effluent outlet. In another embodiment, a discharge in the bottom of a weirless mixing tank employs the column of water to inhibit unreacted sulphur dioxide from exiting the mixing chamber through the bottom discharge outlet. Free floating, unreacted sulphur dioxide gas remaining in the mixing tank rises up to the top of the mixing tank. The top of the mixing tank is adapted with a lid. Undissolved sulphur dioxide gas flowing through the effluent outlet are trapped by a standard u-trap, forcing accumulated gas back into the mixing tank while sulfurous acid exits the system through a first discharge pipe.

To ensure further elimination of any significant emissions of sulphur dioxide gas from the generator into the environment, the sulphur dioxide gas remaining in the mixing tank may be drawn into an exhaust conduit coupled with an exhaust vent on the lid of the mixing tank. The exhaust conduit defines a fourth conduit. Positioned in the fourth conduit is a means for introducing water into the fourth conduit. The water which enters the fourth conduit may be brought from a water source by any means capable of delivering sufficient water to the fourth conduit. As the water is introduced into the fourth conduit, it reacts with the sulphur dioxide gas that has migrated out through the lid of the mixing tank of the absorption tower, and creates sulphurous acid.

In the preferred embodiment, water introduced into the fourth conduit, passes through a second eductor or venturi causing the sulphur dioxide gas to be drawn through the vent and into the fourth conduit. The gas and water are contained in contact as they flow in codirectional flow through one or more contact secondary containment and/or agitation portions of the fourth conduit. Sulphurous acid exits the fourth conduit through a second discharge pipe. The fourth conduit may be constructed of high density polyethylene plastic, pvc or any suitably durable plastic. The material of construction is chosen for its durability and resistance to ultra violet ray degradation. In a preferred embodiment, the second discharge pipe also comprises a u-trap configuration.

In a preferred embodiment upstream from the u-trap of the second discharge pipe, a vent stack houses an exhaust scrubbing tower providing a tertiary containment area. The exhaust scrubbing tower defines grill holes through which the rising, undissolved gases rise. In a preferred embodiment, the exhaust scrubbing tower comprises a cylindrical body which is constructed of polyethylene plastic which is durable, lightweight and resistant to ultra violet ray degradation. At the top of the exhaust scrubbing tower, a third source of water introduces a shower of water through an emitter inside the exhaust tower showering water downward, resulting in a countercurrent flow of undissolved gases and descending water. The rising sulphur dioxide gas comes into countercurrent contact with the descending water, creating sulphurous acid.

The exhaust scrubbing tower is packed with path diverters, which force the countercurrent flow of sulphur dioxide gas and water to pass through a tortuous maze, increasing the duration of time the gas and water remain in contact and the surface area of the contact. Substantially all the free floating sulphur dioxide gas from the mixing tank will react with water in the tower to form sulphurous acid. Sulphurous acid created in the tower flows down into the secondary discharge. Any undissolved gases pass out of the open, upward end of the exhaust scrubbing tower to the atmosphere.

As mentioned, the water introduced into the system to the third conduit, fourth conduit and exhaust scrubbing tower may be brought from a water source to the system by any means capable of delivering sufficient water and pressure, such as a standing, elevated water tank, or mechanical, electric or diesel powered water pump.

The present invention also contemplates means for controlling the burn rate of sulphur in the burning chamber, that is, dampening the flow or amount of air made available into the burning chamber.

It is an object of this invention to create a sulfurous acid generator that is simple to manufacture, use, maintain and service.

It is also an object of this invention to construct the hopper and burn chamber out of a high-temperature concrete to reduce manufacturing costs.

It is another object of this invention to eliminate reliance upon countercurrent absorption as the prior mechanism for creating sulphurous acid as taught by the prior art.

It is further an object of this invention to create a sulfurous acid generator that is capable of operating without any electrical equipment such as pumps, air compressor or exhaust fans requiring a specific energy source requirement, such as electricity or diesel fuels.

It is another object of this invention to produce a sulphurous acid generator which converts substantially all sulfur dioxide gas generated into sulphurous acid.

It is another object of the invention to produce a sulfurous acid generator which uses an induced draw created by the flow of water through the system to draw gases through the otherwise open system.

Another object of the present invention is to provide a sulphurous acid generator with one or more contact containment and/or agitation and mixing mechanisms to increase the duration of time during which the sulphur dioxide gas is in contact with and mixed with water.

It is an object of this invention to produce a sulphurous acid generator which substantially eliminates emission of harmful sulphur dioxide gas.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly depicted above will be rendered by reference to a specific embodiment thereof which is illustrated in the appended drawings. With the understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
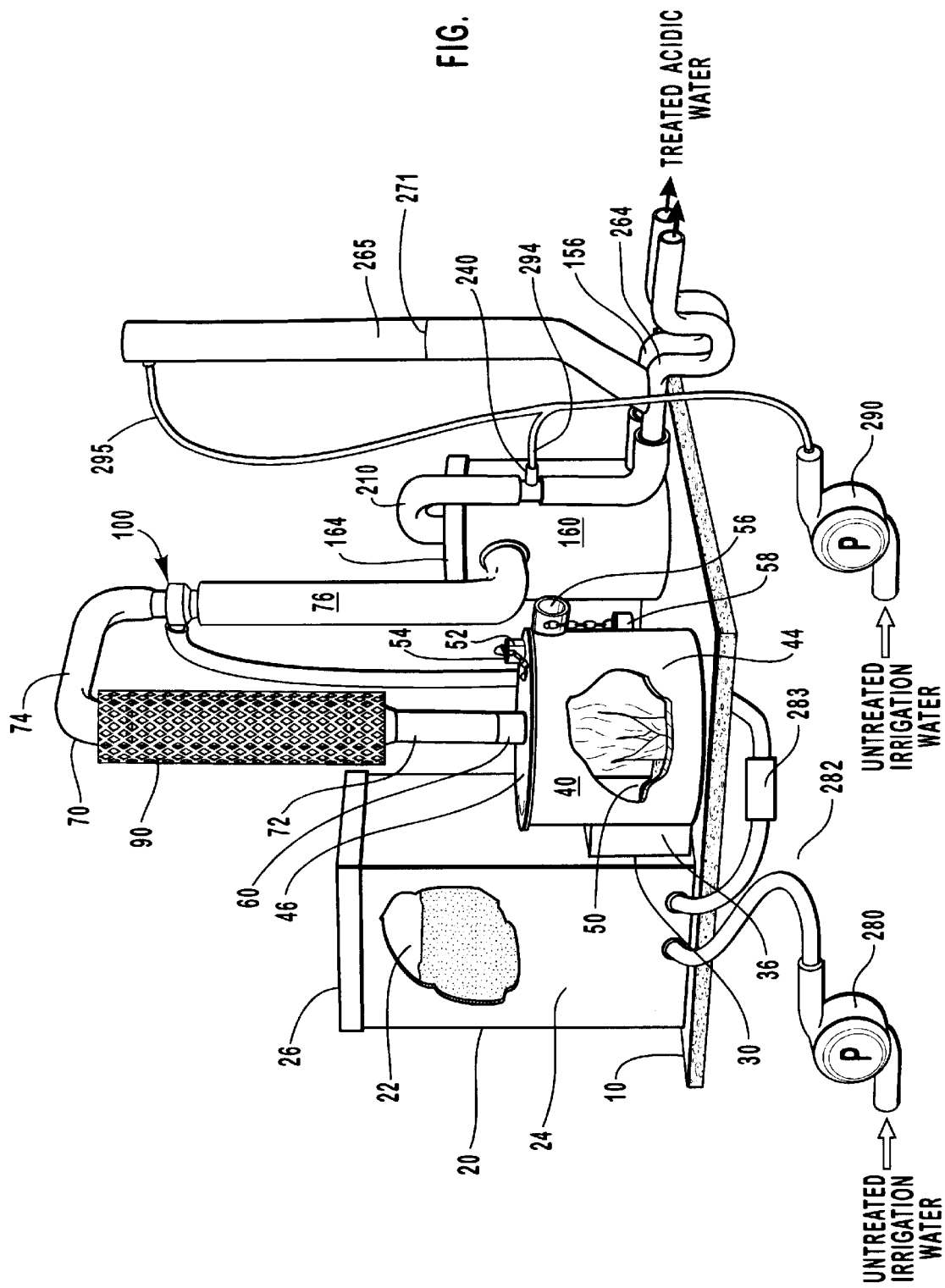
FIG. 1 is a perspective view of one embodiment of the sulphurous acid generator.
Figure 2:
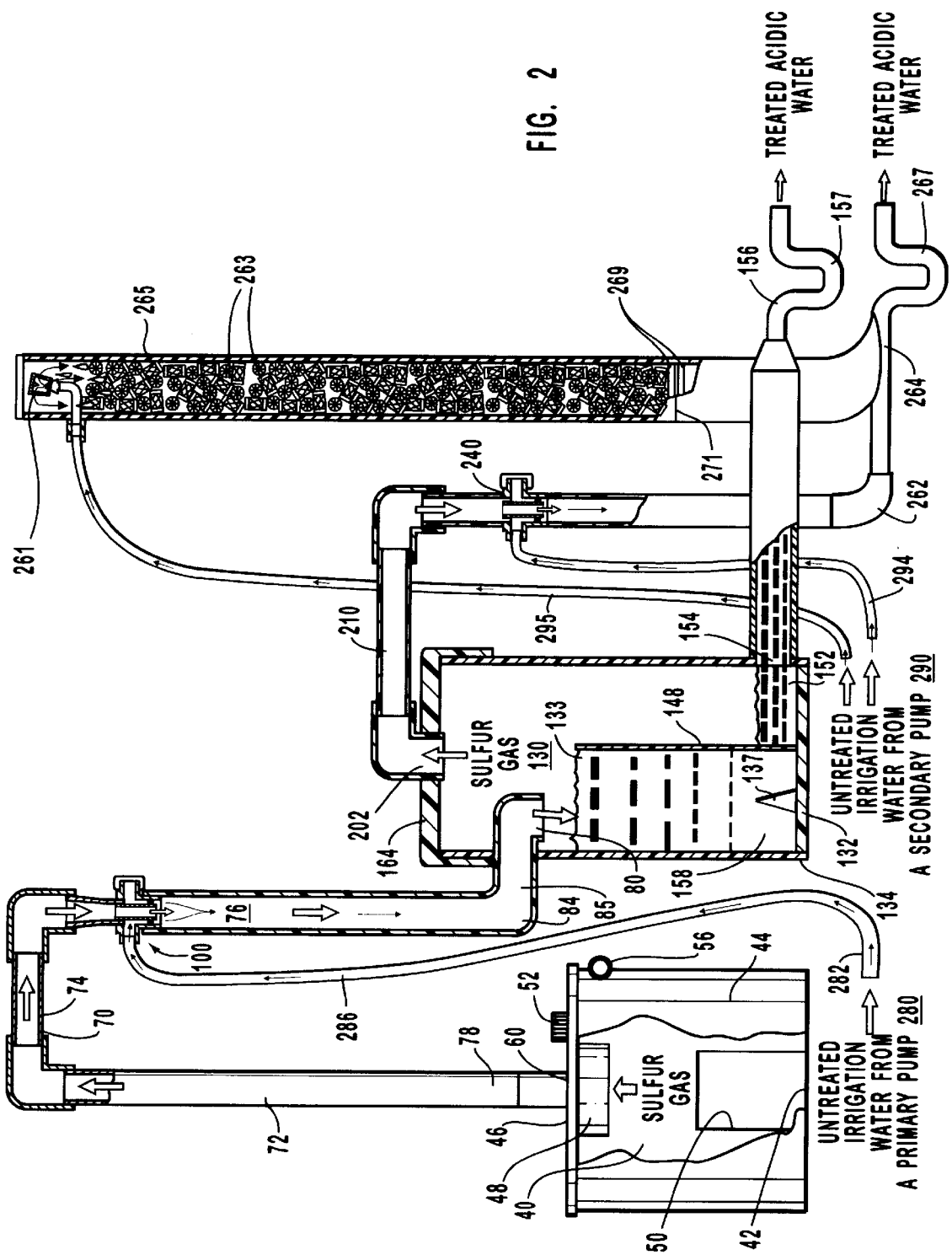
FIG. 2 is a side elevation view partly in cutaway cross-section of the components of the sulphurous acid generator.
Figure 3:
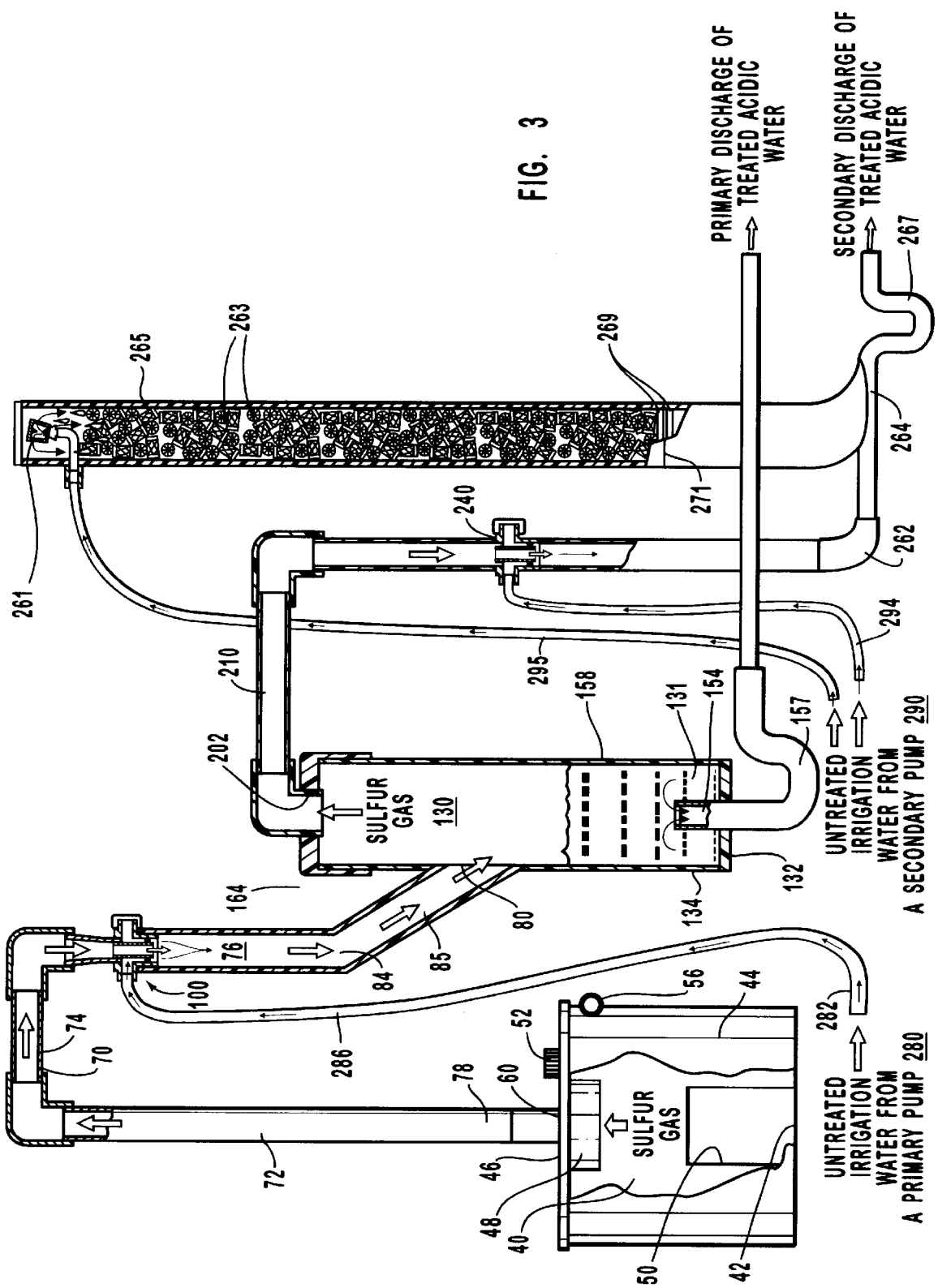
FIG. 3 is a side elevation view partly in cut-away cross-section of an alternative embodiment.

Including by reference the figures listed above, applicant's sulfurous acid generator comprises a system which generates sulphur dioxide gas and keeps the gas substantially contained and in contact with water for extended periods of time substantially eliminating any significant release of harmful sulphur dioxide gas from the system as shown in FIGS. 1, 2, and 3. The principal elements of the present invention are shown in FIGS. 1–8.

The sulphur hopper 20 comprises enclosure 24 with a lid 26. Lid 26 may define a closeable aperture, not shown. Enclosure 24 may be of any geometric shape; square is shown, cylindrical may also be employed. Lid 26 of enclosure 24 is readily removable to allow sulphur to be loaded into hopper 20. Enclosure 24 defines a hopper outlet 30. Hopper 20 is configured such that sulphur in hopper 20 is directed toward hopper outlet 30 by the pull of gravity. Hopper outlet 30 allows sulphur to pass through and out of hopper 20.

Figure 1B:
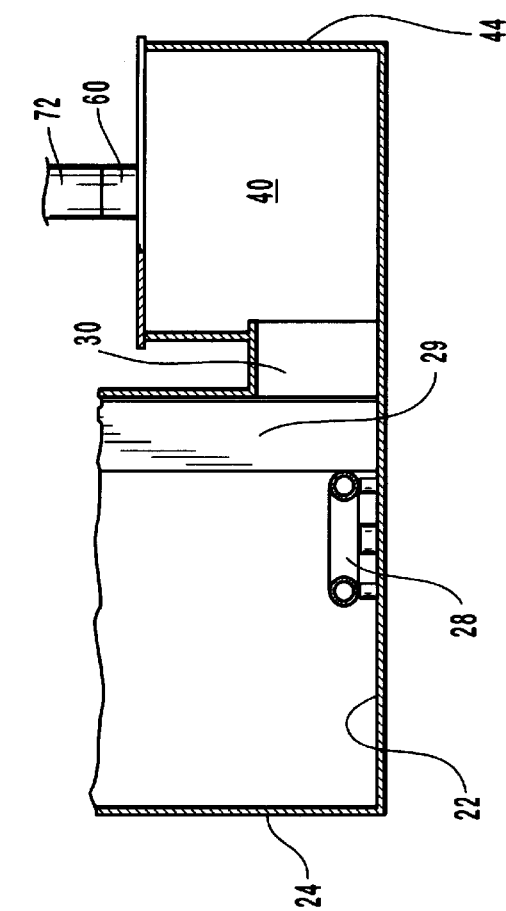
Figure 1A:
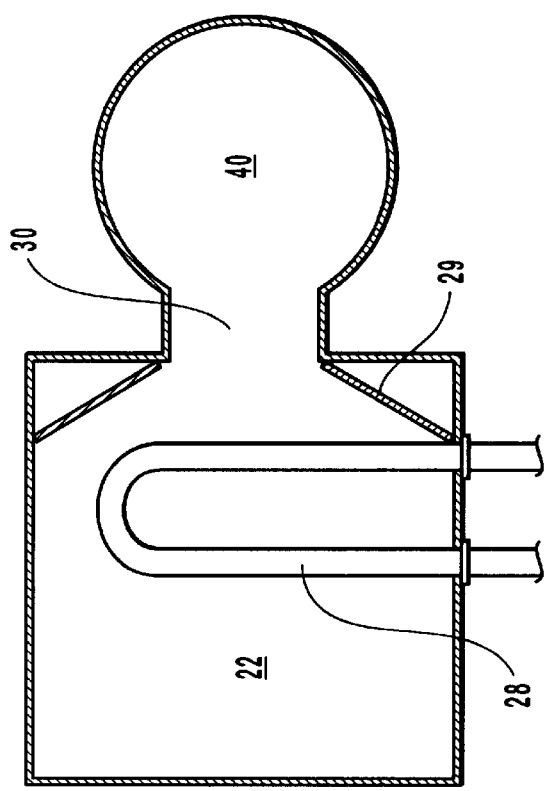

FIG. 1A illustrates a plan view of open hopper 20. Hopper 20 comprises a base or floor 22. In the preferred embodiment, a cooling ring 28 is disposed about ½ inch above base 22. As shown in FIG. 1, untreated irrigation water is circulated through cooling ring 28. See also FIG. 1B. FIGS. 1A and 1B also disclose vertical standing baffles 29. In practice of the invention it has been discovered that baffles 29 assist in directing the dry sulphur to hopper outlet 30. Practice of the invention has also revealed that cooling ring 28 is most effective when placed closer to hopper outlet 30 rather than the middle of base 22 or farther away from hopper outlet 30. The effect cooling ring 28 has on molten sulphur will be discussed below.

A passageway conduit 36 communicates between hopper outlet 30 and burn chamber inlet 50 of burn chamber 40.

Burn chamber 40 comprises floor member 42, chamber sidewall 44 and roof member 46. Roof member 46 is removably attached to chamber sidewall 44 supporting roof member 46. Roof member 46 defines an ignition inlet 52 as having a removably attached ignition inlet cover 54. An air inlet 56 defined by chamber sidewall 44 has a removably attached air inlet cover 58. The air inlet 56 preferably enters the chamber sidewall 44 tangentially. An exhaust opening 60 in the burn chamber 40 is defined by the roof member 46.

Figure 4:
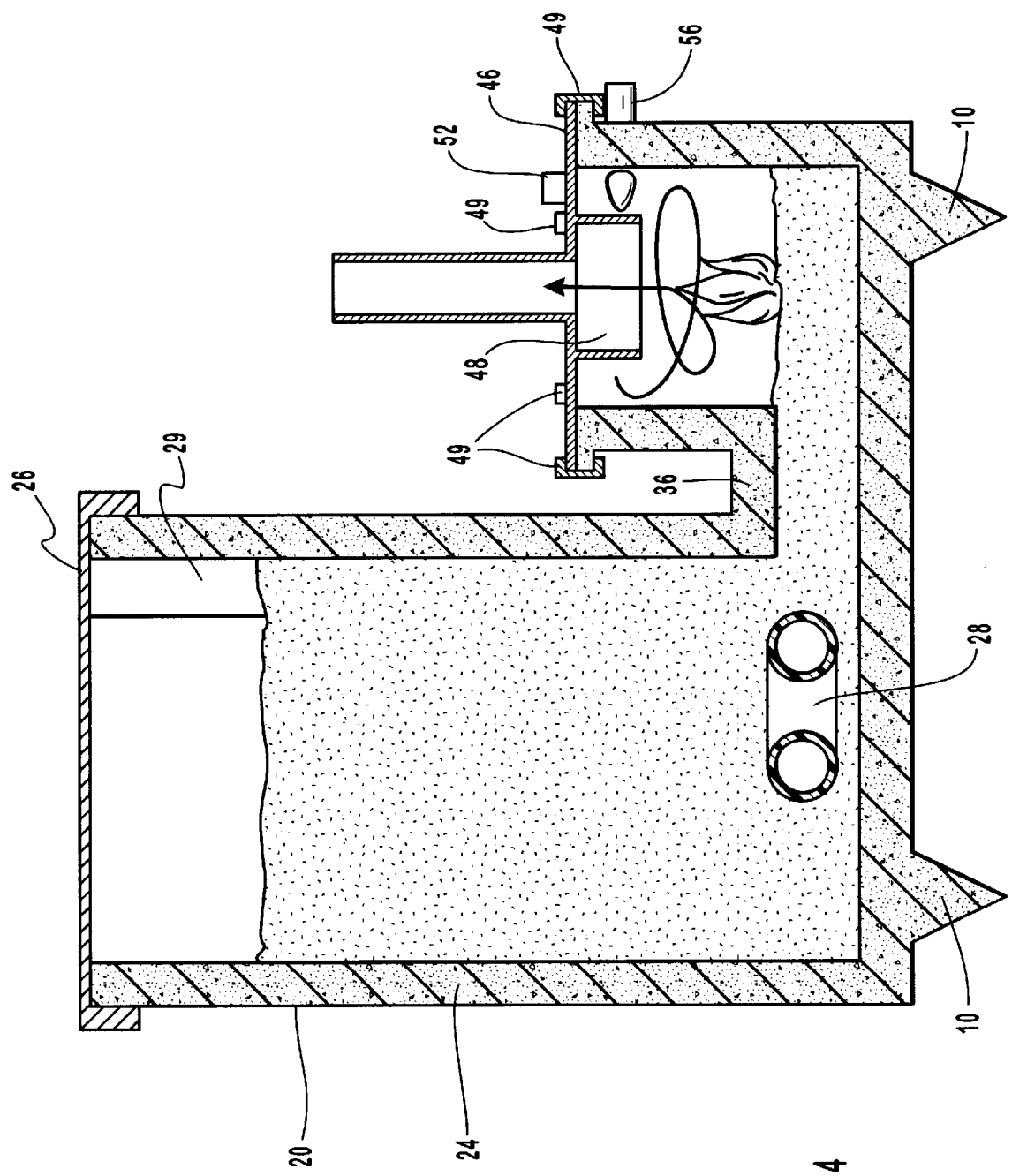
FIG. 4 is a cross-sectional view of the Saggregate™ concrete embodiment of the sulphur hopper and burning chamber.

As shown in FIGS. 2, 3, and 4, roof member 46 also defines a downwardly extending annular ring 48. In the preferred embodiment, ring 48 extends downwardly into burn chamber 40 at least as low as air inlet 56 is disposed. It is understood and believed that this configuration causes not only inlet air to swirl in a cyclone effect into burn chamber 40 but induces a swirling or cyclone effect of the combusted sulphur dioxide gas as it rises in burn chamber 40 and passing up through exhaust opening 60 and gas pipeline 70. Roof member 46 is secured to sidewall 44 of burn chamber 40 by either bolting roof member 46 to burn chamber to the top of sidewall 44 in any conventional fashion, or as shown in FIG. 4, by employing removable C-clamps 49.

Hopper 20, passageway conduit 36 and burn chamber 40 may be constructed of stainless steel. In such case, roof member 46 could be removably bolted to burn chamber 40. In an alternative embodiment shown in FIG. 4, hopper 20, passageway conduit 36 and burn chamber 40 as well as a platform or legs 10 may be constructed of Saggregate™ concrete. Saggregate™ concrete is a unique blend of cement and other components. The Saggregate™ concrete comprises a cement component, two aggregate components, and a water component. The preferred cement component is Lumnite MG® ("Lumnite® cement"), Heidelberger Calcium Aluminate Cement from Heidelberger Calcium Aluminates, Inc., Allentown, Pa., United States of America. The preferred Lumnite® has a 7000 pound crush weight nature. The first aggregate is preferably a pea-sized medium shale sold by Utelite Corp., Wanship, Utah, 84017, United States of America. A second aggregate is preferably a crushed mesh or crushed fines inorganic aggregate. The preferred fine-sized aggregate is PAKMIX® Lightweight Soil Conditioner® produced by Utelite Corp., Wanship, Utah, 84017, United States of America. The Pakmix® aggregate comprises No. 10 crushed fines of shale capable of bearing temperatures up to 2000 degrees Farenheit.

The mixing ratio of the cement, first aggregate, second aggregate and water are as follows. The ratio of Lumnite® cement to combined aggregates is 1:3 by volume. The ratio of water to Lumnite® cement by weight is 0.4:1. Operational results are achieved when the volume ratio of pea-sized medium shale aggregate to Lumnite® cement ranges from about 0:1 to about 3.0:1 and where the volume ratio of crushed mesh/crushed shale fines aggregate to Lumnite® cement ranges from about 0:1 to about 3.0:1. More satisfactory results are achieved when the volume ratio of pea-sized medium shale aggregate to Lumnite® cement ranges from about 1:1 to about 1.5:1 and where the volume ratio of crushed mesh/crushed shale fines aggregate to Lumnite® cement ranges from about 1.5:1 to about 2.0:1. The most favorable results occur when the pea-sized medium shale aggregate is mixed in a ratio to Lumnite® cement in a range from about 1.2:1 to about 1.3:1 by volume and wherein the crushed mesh/crushed shale fines aggregate component is present in a ratio to Lumnite® cement in a range from about 1.7:1 to about 1.8:1 by volume.

Embodiments of the Saggregate™ concrete of the present invention discussed above and illustrated in FIG. 4 were made in the following manner:

| Component | Amount |
| --- | --- |
| Lumnite ® cement | one volume unit |
| pea-sized medium shale | 1.5 × one volume unit |
| crushed fine shale | 1.5 × one volume unit |
| water | .4 × weight of one volume unit of Lumnite ® |

For example, one cubic foot of Lumnite® cement is measured and weighed, the weight of one cubic foot of Lumnite® cement being noted. Measure one and one-half cubic feet of pea-sized medium shale. Measure one and one-half cubic feet of crushed fine shale. Mix the Lumnite® cement, pea-sized medium shale and crushed fine shale together to create a dry mix. Measure an amount of water equal to 0.4 times the weight of the one cubic foot of Lumnite® cement. Add the amount of water to the dry mix to create Saggregate™ concrete. Mix, handle, pour, cure and treat the Saggregate™ concrete like conventional concrete. In the context of the present invention, Saggregate™ concrete was used with suitable molds to form the desired hopper-burn chamber assembly capable of withstanding the heat of burning and molten sulphur in use.

Other embodiments of the Saggregate™ concrete of the present invention discussed above and illustrated in FIG. 4 may be made in the following manner:

| Component | Amount |
| --- | --- |
| Lumnite ® cement | one volume unit |
| pea-sized medium shale | 3.0 × one volume unit |
| crushed fine shale | None |
| water | .4 × weight of one volume unit of Lumnite ® cement |

For example, one cubic foot of Lumnite® cement is measured and weighed, the weight of one cubic foot of Lumnite® cement being noted. Measure three cubic feet of pea-sized medium shale. Use no crushed fine shale. Mix the Lumnite® cement and pea-sized medium shale together to create a dry mix. Measure an amount of water equal to 0.4 times the weight of the three cubic feet of Lumnite® cement.

Add the amount of water to the dry mix to create Saggregate™ concrete. Mix, handle, pour, cure and treat the Saggregate™ concrete like conventional concrete. In the context of the present invention, Saggregate™ concrete is used with suitable molds to form the desired hopper-burn chamber assembly capable of withstanding the heat of burning and molten sulphur in use.

| Component | Amount |
| --- | --- |
| Lumnite ® cement | one volume unit |
| pea-sized medium shale | None |
| crushed fine shale | 3.0 × one volume unit |
| water | .4 × weight of one volume unit of Lumnite ® cement |

For example, one cubic foot of Lumnite® cement is measured and weighed, the weight of one cubic foot of Lumnite® cement being noted. Use no pea-sized medium shale. Measure three cubic feet of crushed fine shale. Mix the Lumnite® cement and crushed fine shale together to create a dry mix. Measure an amount of water equal to 0.4 times the weight of the one cubic foot of Lumnite® cement. Add the amount of water to the dry mix to create Saggregate™ concrete. Mix, handle, pour, cure and treat the Saggregate™ concrete like conventional concrete. In the context of the present invention, Saggregate™ concrete is used with suitable molds to form the desired hopper-burn chamber assembly capable of withstanding the heat of burning and molten sulphur in use.

| Component | Amount |
| --- | --- |
| Lumnite ® cement | one volume unit |
| pea-sized medium shale | .4 × one volume unit |
| crushed fine shale | 2.6 × one volume unit |
| water | .4 × weight of one volume unit of Lumnite ® cement |

For example, one cubic foot of Lumnite® cement is measured and weighed, the weight of one cubic foot of Lumnite® cement being noted. Measure 0.4 cubic foot of pea-sized medium shale. Measure 2.6 cubic feet of crushed fine shale. Mix the Lumnite® cement, pea-sized medium shale and crushed fine shale together to create a dry mix. Measure an amount of water equal to 0.4 times the weight of the one cubic foot of Lumnite® cement. Add the amount of water to the dry mix to create Saggregate™ concrete. Mix, handle, pour, cure and treat the Saggregate™ concrete like conventional concrete. In the context of the present invention, Saggregate™ concrete is used with suitable molds to form the desired hopper-burn chamber assembly capable of withstanding the heat of burning and molten sulphur in use.

| Component | Amount |
| --- | --- |
| Lumnite ® cement | one volume unit |
| pea-sized medium shale | one volume unit |
| crushed fine shale | 2.0 × one volume unit |
| water | .4 × weight of one volume unit of Lumnite ® |

For example, one cubic foot of Lumnite® cement is measured and weighed, the weight of one cubic foot of Lumnite® cement being noted. Measure one cubic foot of pea-sized medium shale. Measure two cubic feet of crushed fine shale. Mix the Lumnite® cement, pea-sized medium shale and crushed fine shale together to create a dry mix. Measure an amount of water equal to 0.4 times the weight of the one cubic foot of Lumnite® cement. Add the amount of water to the dry mix to create Saggregate™ concrete. Mix, handle, pour, cure and treat the Saggregate™ concrete like conventional concrete. In the context of the present invention, Saggregate™ concrete is used with suitable molds to form the desired hopper-burn chamber assembly capable of withstanding the heat of burning and molten sulphur in use.

| Component | Amount |
| --- | --- |
| Lumnite ® cement | one volume unit |
| pea-sized medium shale | 1.1 × one volume unit |
| crushed fine shale | 1.9 × one volume unit |
| water | .4 × weight of one volume unit of Lumnite ® |

For example, one cubic foot of Lumnite® cement is measured and weighed, the weight of one cubic foot of Lumnite® cement being noted. Measure one and one-tenth cubic feet of pea-sized medium shale. Measure one and nine-tenths cubic feet of crushed fine shale. Mix the Lumnite® cement, pea-sized medium shale and crushed fine shale together to create a dry mix. Measure an amount of water equal to 0.4 times the weight of the one cubic foot of Lumnite® cement. Add the amount of water to the dry mix to create Saggregate™ concrete. Mix, handle, pour, cure and treat the Saggregate™ concrete like conventional concrete. In the context of the present invention, Saggregate™ concrete is used with suitable molds to form the desired hopper-burn chamber assembly capable of withstanding the heat of burning and molten sulphur use.

| Component | Amount |
| --- | --- |
| Lumnite ® cement | one volume unit |
| pea-sized medium shale | 1.2 × one volume unit |
| crushed fine shale | 1.8 × one volume unit |
| water | .4 × weight of one volume unit of Lumnite ® |

For example, one cubic foot of Lumnite® cement is measured and weighed, the weight of one cubic foot of Lumnite® cement being noted. Measure one and two-tenths cubic feet of pea-sized medium shale. Measure one and eight-tenths cubic feet of crushed fine shale. Mix the Lumnite® cement, pea-sized medium shale and crushed fine shale together to create a dry mix. Measure an amount of water equal to 0.4 times the weight of the one cubic foot of Lumnite® cement. Add the amount of water to the dry mix to create Saggregate™ concrete. Mix, handle, pour, cure and treat the Saggregate™ concrete like conventional concrete. In the context of the present invention, Saggregate™ concrete is used with suitable molds to form the desired hopper-burn chamber assembly capable of withstanding the heat of burning and molten sulphur in use.

| Component | Amount |
| --- | --- |
| Lumnite ® cement | one volume unit |
| pea-sized medium shale | 1.3 x one volume unit |
| crushed fine shale | 1.7 x one volume unit |
| water | .4 x weight of one volume unit of Lumnite ® |

For example, one cubic foot of Lumnite® cement is measured and weighed, the weight of one cubic foot of Lumnite® cement being noted. Measure one and three-tenths cubic feet of pea-sized medium shale. Measure one and seven-tenths cubic feet of crushed fine shale. Mix the Lumnite® cement, pea-sized medium shale and crushed fine shale together to create a dry mix. Measure an amount of water equal to 0.4 times the weight of the one cubic foot of Lumnite® cement. Add the amount of water to the dry mix to create Saggregate™ concrete. Mix, handle, pour, cure and treat the Saggregate™ concrete like conventional concrete. In the context of the present invention, Saggregate™ concrete is used with suitable molds to form the desired hopper-burn chamber assembly capable of withstanding the heat of burning and molten sulphur in use.

| Component | Amount |
| --- | --- |
| Lumnite ® cement | one volume unit |
| pea-sized medium shale | 1.4 x one volume unit |
| crushed fine shale | 1.6 x one volume unit |
| water | .4 x weight of one volume unit of Lumnite ® |

For example, one cubic foot of Lumnite® cement is measured and weighed, the weight of one cubic foot of Lumnite® cement being noted. Measure one and four-tenths cubic feet of pea-sized medium shale. Measure one and six-tenths cubic feet of crushed fine shale. Mix the Lumnite® cement, pea-sized medium shale and crushed fine shale together to create a dry mix. Measure an amount of water equal to 0.4 times the weight of the one cubic foot of Lumnite® cement. Add the amount of water to the dry mix to create Saggregate™ concrete. Mix, handle, pour, cure and treat the Saggregate™ concrete like conventional concrete. In the context of the present invention, Saggregate™ concrete is used with suitable molds to form the desired hopper-burn chamber assembly capable of withstanding the heat of burning and molten sulphur in use.

The dry mix of Lumnite® cement and aggregates can be pre-mixed and bagged together. This greatly simplifies construction for the user because all components of the Saggregate™ concrete are provided except water which can be provided on site. When mixed and cured, the Saggregate™ concrete is easily capable of withstanding the 400 to 600 degree Fahrenheit temperature of the burning and molten sulphur in burning chamber 40.

In the preferred embodiment using Saggregate™ concrete to construct base 22 and sidewall 24 of hopper 20 should be 2½ to 3 inches thick. Similarly, the walls of the conduit passageway 36 and base 42 and sidewall 44 of burn chamber 40 should also have Saggregate™ concrete in the thickness of about 2½ to 3 inches. In the configuration shown in FIG .4, lid 26 may be constructed of virtually any material, including wood, plastic, or any other material. Due to the extreme heat generated in burn chamber 40, roof member 46 must be made of a material that will withstand such extreme temperatures. Preferably, roof member 46 is constructed of stainless steel.

As shown in FIG. 4, feet 10 may also be constructed of Saggregate™ concrete. Feet 10 are used to permit air to radiate under the bottom of hopper 20 and burning chamber 40 to dissipate radiant heat. As shown in FIGS. 1A, 1B and 4, an additional advantage of placing cooling ring 28 in the hopper near passage conduit 36 results in a physical barrier and temperature barrier of any molten sulphur flowing from burning chamber 40 through conduit passageway 36 into hopper 20. In other words, the physical location of cooling ring 28 and the temperature gradient caused thereby, impedes the flow of any molten sulphur out of conduit passageway 36 so as to confine molten sulphur between cooling ring 28 and fluid conduit passageway 36. In a preferred embodiment, the hopper is in a square shape that has a cross-section of about 18 inches by 18 inches and is about 30 inches high in its inside dimensions. If a cylindrical shaped hopper is employed, an inside diameter of about 18 inches is preferred. In such a case, the inside height dimension of conduit passageway 36 is about 5 inches in inside height and about 10 inches in inside width with the burning chamber 40 being about 12 inches in height and having an inside diameter of 10 inches. This embodiment burns about 5 pounds of sulphur or less per hour and is capable of treating about 15 to 100 gallons of water per minute.

In another larger embodiment, the hopper, if square, could have inside dimensions of about 32 inches by 42 inches, with a height of about 48 inches with the inside height dimension of conduit passageway 36 being about 6 inches in inside height and about 11 inches in inside width with a burn chamber having a height of about 16 inches and an inside diameter of about 18 inches. In this embodiment, tests have revealed that about 20 pounds of sulphur or less per hour is burned and the amount of water being treated may range from about 20 gallons per minute to about 300 gallons per minute.

Figure 8A:
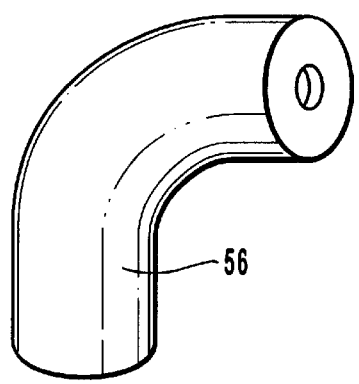
FIGS. 8A to 8E illustrate alternative embodiments dampening available air or oxygen flowing into the burning chamber for combustion.

The present invention also contemplates a means for controlling the burn rate of sulphur in burn chamber 40. FIGS. 8A through 8E represent different means for dampening air intake through air inlet 56. FIG. 8A illustrates a curved and/or occluded end of air inlet 56. Tests have revealed that a substantially centered hole having a diameter of about 1 to about 2 inches permits effective control of the burn of sulphur in chamber 40.

Figure 8B:
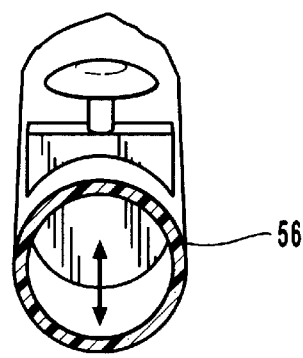

FIG. 8B illustrates a conventional gate valve which can be placed along air inlet 56 to selectively dampen the flow of air into burn chamber 40.

Figure 8D:
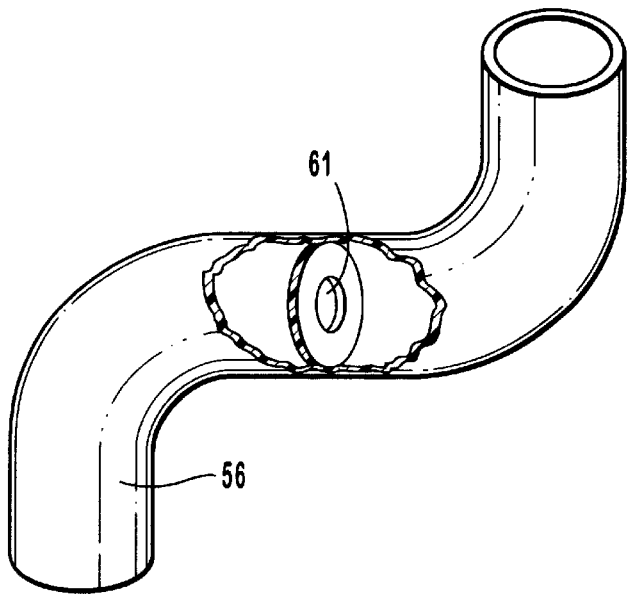
Figure 8C:
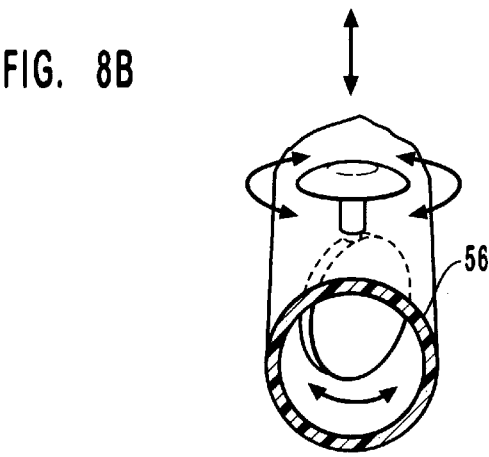

Similarly, FIG. 8C illustrates a conventional ball valve effective in restricting flow. Use of such a ball valve permits selective dampening or control of air through air inlet 56 into burn chamber 40.

FIG. 8D illustrates another embodiment in which a bend in air inlet 56 is followed by a ring disposed within air inlet 56 defining an opening 61 substantially perpendicular to the direction of flow of air. Air inlet 56 also has a second bend.

Figure 8E:
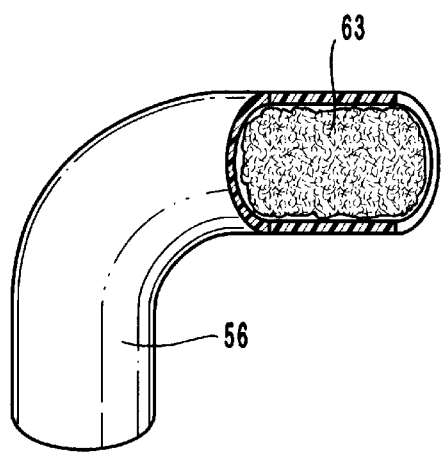

The preferred means for dampening the flow of air into burn chamber 40 is illustrated in FIG. 8E. Air inlet 56 has a curve or bend and is packed with stainless steel mesh or wool.

In all the embodiments of FIGS. 8A through 8E, air inlet 56 comprises a pipe or conduit having a diameter of about 3 inches.

Sulphur supplied to the burn chamber 40 through the conduit inlet 50 can be ignited through the ignition inlet 52. The air inlet 56 allows oxygen, necessary for the combustion process, to enter into the burn chamber 40 and thus permits regulation of the rate of combustion. The exhaust opening 60 allows the sulphur dioxide gas to pass up through the exhaust opening 60 and into the gas pipeline 70.

The gas pipeline 70 has two ends, the first end 78 communicating with the exhaust opening 60, the second end terminating at a third conduit 76. The gas pipeline or first conduit 70 may comprise an ascending pipe 72 and a transverse pipe 74. The ascending pipe 72 may communicate with the transverse pipe 74 by means a first 90 degree elbowjoint. Disposed about and secured to the ascending pipe 72 is a protective grate 90 to prevent unintended external contact with member 72 which is hot when in use.

Water is conducted through a second conduit 282 to a point at which the second conduit 282 couples with the first conduit 70 at a third conduit 76.

Conduit 76 comprises a means 100 for bringing the sulphur dioxide gas in the first conduit 70 and the water in second conduit 282 into contained codirectional flow. Water and sulphur dioxide gas are brought into contact with each other whereby sulphur dioxide gas dissolves into the water.

Figure 5:
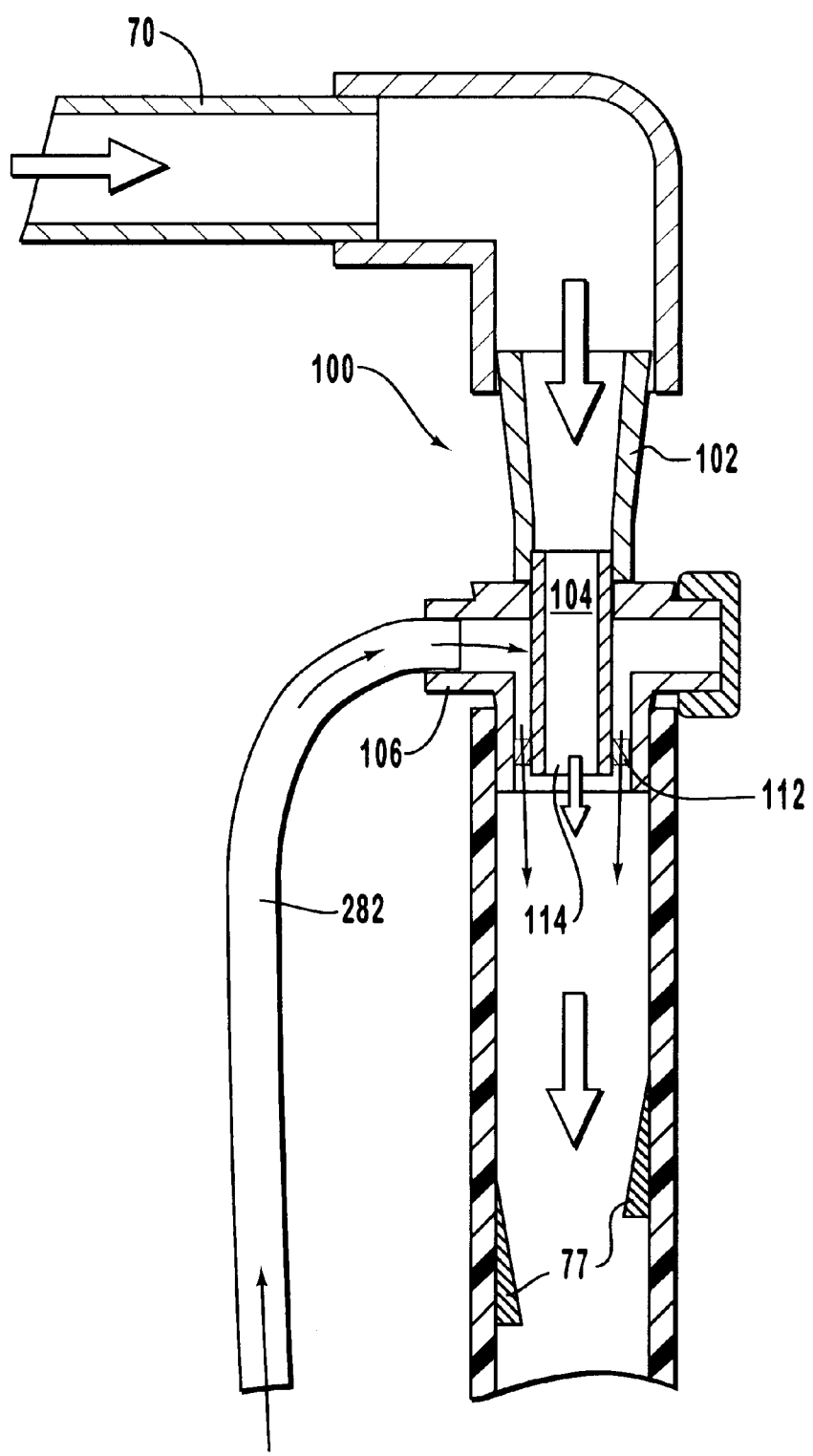
FIG. 5 is an enlarged view of a portion of a third conduit.

The codirectional flow means 100 shown in FIGS. 2, 3, and 5 comprises a central body 102, central body 102 defining a gas entry 104 and a sulfur dioxide gas exiting outlet 114, central body 102 further comprising a secondary conduit inlet 106, and a water eductor 112. Eductor 112 generates a swirling annular column of water to encircle gas exiting outlet 114. The water flow, thermal cooling and reaction are believed to assist in drawing sulphur dioxide gas from burn chamber 40 into gas pipeline 70 where the gas is brought into contact with water to create sulphurous acid.

The codirection flow means 100 allows water to be introduced into the third conduit 76 initially through a second conduit inlet 106. The water entering the codirectional means 100 passes through the eductor 112 and, exits adjacent the sulphur dioxide gas outlet 114. The water enters the third conduit 76 and comes into contact with the sulphur dioxide gas by surrounding the sulphur dioxide gas where the sulphur dioxide gas and water are contained in contact with each other. The water and sulphur dioxide gas react to form an acid of sulphur. This first contact containment portion of conduit 76 does not obstruct the flow of the sulphur dioxide gas. It is believed that a substantial portion of the sulphur dioxide gas will react with the water in this first contact containment area.

After the acid and any host water (hereafter "water/acid") and any remaining unreacted gas continue to flow through third conduit 76, the water/acid and unreacted sulphur dioxide gas are mixed and agitated to further facilitate reaction of the sulphur dioxide with the water/acid. Means for mixing and agitating the flow of water/acid and sulphur dioxide gas is accomplished in a number of ways. For example, as shown in FIG. 2, mixing and agitating can be accomplished by changing the direction of the flow such as a bend 84 in the third conduit 76. Another example includes placing an object 77 inside the third conduit 76 to alter the flow pattern in the third conduit 76 as shown in FIG. 5. This could entail a flow altering wedge, flange, bump or other member 77 along the codirectional flow path in third conduit 76. By placing an object in the flow path, a straight or substantially straight conduit may be employed. The distinction of this invention over the prior art is mixing and agitating the flow of water/acid and sulphur dioxide in an open codirectionally flowing system. One embodiment of the present invention can treat between 20 and 300 gallons of water per minute coursing through third conduit 76 being held in contained contact with the sulphur dioxide gas.

After the water/acid and sulphur dioxide gas have passed through an agitation and mixing portion of third conduit 76, the water/acid and unreacted sulphur dioxide gas are again contained in contact with each other to further facilitate reaction between the components to create an acid of sulphur. This is accomplished by means for containing the water/acid and sulphur dioxide gas in contact with each other. One embodiment is shown in FIG. 2 as a portion 85 of third conduit 76. Portion 85 acts much in the same way as the earlier described contact containment portion.

As shown in FIG. 2, additional means for mixing and agitating the codirectional flow of water/acid and sulphur dioxide gas is employed. One embodiment is illustrated as portion 86 of third conduit 76 in which again the directional flow of the water/acid and sulphur dioxide gas is directionally altered. In this way, the water/acid and sulphur dioxide gas are forced to mix and agitate, further facilitating reaction of the sulphur dioxide gas to further produce or concentrate an acid of sulphur.

In the embodiment shown in FIG. 2, third conduit 76 also incorporates means for discharging the water/acid and unreacted sulphur dioxide gas from third conduit 76. One embodiment is shown in FIG. 2 as discharge opening 80 defined by third conduit 76. Discharge opening 80 is preferably positioned approximately in the center of the pooling section, described below. In the preferred embodiment, discharge 80 is configured so as to direct the discharge of water/acid and unreacted sulphur dioxide gas downward into a submersion pool 158 without creating a back pressure. In other words, discharge 80 is sufficiently close to the surface 133 of the fluid in the submersion pool to cause unreacted sulphur dioxide gas to be forced into the submersion pool, but not below the surface of the fluid in the submersion pool, thereby maintaining the open nature of the system and to avoid creating back pressure in the system.

As illustrated in FIG. 2, one embodiment of the present invention also utilizes a tank 130 having a bottom 132, a tank sidewall 134, and a lid 164. Tank 130 may also comprise a fluid dispersion member 137 to disperse churning sulphurous acid and sulphur dioxide gas throughout tank 130. Dispersion member 137 may have a conical shape or any other shape which facilitates dispersion. A weir 148 may be attached on one side to the bottom member 132 and is attached on two sides to the tank sidewall 134. The weir 148 extends upwardly to a distance stopping below the discharge 80. The weir 148 divides the mixing tank 130 into a submersion pool 158 and an outlet section 152. The third conduit 76 penetrates either tank sidewall 134 or lid 164 (not shown). An outlet aperture 154 is positioned in the tank sidewall 134 near the bottom member 132 in the outlet section. The drainage aperture 154 is connected to a drainage pipe 156. Drainage pipe 156 is adapted with a u-trap 157. U-trap 157 acts as means to trap and force undissolved gases in a submersion zone, including sulphur dioxide gas, back into chamber 130 to exit through lid 164 into vent conduit 210. Sulphurous acid exits pipe 156 or primary discharge.

As sulphurous acid flows out of the third conduit 76, the weir 148 dams the water/acid coming into the mixing tank 130 creating a churning submission pool 158 of sulphurous acid. Sulphur dioxide gas carried by but not yet reacted in the sulphurous acid is carried into submersion pool of acid 158 because of the proximity of the discharge 80 to the surface 133 of the pool 158. The carried gas is submerged in the churning submersion pool 158. The suspended gas is momentarily churned in contact with acid in pool 158 to further concentrate the acid. As unreacted gas rises up through the pool, the unreacted gas is held in contact with water and further reacts to further form concentrate sulphurous acid. The combination of the discharge 80 and its close proximity to the surface 133 of pool of acid 158 creates a means for facilitating and maintaining the submersion of unreacted sulphur dioxide gas discharged from the third conduit into the submersion pool of sulphurous acid to substantially reduce the separation of unreacted sulphur dioxide gas from contact with the sulphurous acid to promote further reaction of the sulphur dioxide gas in the sulphurous acid in an open system without subjecting the sulphur dioxide gas discharged from the third conduit to back pressure or system pressure. That is, discharge 80 positions below the level of the top of weir 148 is contemplated as inconsistent with the open system illustrated by FIG. 2. However, discharge 80 may be positioned below the level of the top of weir 148 or below the surface of submersion pool 158.

As sulphurous acid enters the mixing tank 130 from the third conduit 76 the level of the pool 132 of sulphurous acid rises until the acid spills over the weir 148 into the outlet section 152. Sulphurous acid and sulphur dioxide gas flow out of the mixing tank 130 into the drainage pipe 156. Drainage pipe 156 is provided with a submersion zone in the u-trap 157 in which sulphur dioxide gas is again mixed into the sulphurous acid and which prevents sulphur dioxide gas from exiting the drainage pipe or primary discharge 156 in any significant amount.

Referring to the embodiment illustrated in FIG. 3, first conduit 70 and second conduit 282 are coupled as discussed above. However, in this embodiment, third conduit 76 may have a bend 84 to transition to length 85 and define a discharge opening 80 into mixing tank 130. As shown in this embodiment, the water/acid and undissolved sulphur dioxide enter the mixing tank in a downward angle direction. Another embodiment, not shown, contemplates third conduit 76 entering directly into the top of mixing chamber 130 through lid 164.

Mixing tank 130 of the embodiment of FIG. 3 comprises a bottom member 132 defining an outlet aperture 154. Mixing tank 130 has a diameter of about 6 to 8 inches. As a result, the inside volume of mixing tank 130 is such that as water/acid begins to fill tank 130 and interacts with u-trap 157, the level of water/acid rises and falls in a flushing action.

As water/acid discharges from third conduit 76 into mixing tank 130, it results in a turbulent washing machine effect forcing undissolved sulphur dioxide gas into the churning water/acid in mixing tank 130. As depicted in FIG. 3, u-trap 157 extends vertically a distance up into mixing tank 130 through floor member 132. This configuration provides a further agitation zone 131 in which descending waters/acid must change its direction and ascend in tank 130 before exiting out u-trap 157. As a result, submersion pool 158 in use represents a churning pool wherein undissolved sulphur dioxide is contained in water/acid for further dissolution and/or in u-trap 157 acts to trap and direct undissolved gases back up through submersion pool 158 to escape out exhaust vent 202 and enter into vent conduit 210. On the other hand, sulphurous acid exits the system through drainage pipe or primary discharge 156.

For the embodiments shown in both FIGS. 2 and 3, any free floating sulphur dioxide gas in mixing tank 130 rises up to the lid 164. The lid 164 defines an exhaust vent 202. Exhaust vent 202 may be coupled with a vent conduit 210. The vent conduit 210 has a first end which couples with the exhaust vent 202 and a second end which terminates at a fourth conduit 220. The vent conduit 210 may consist of a length a pipe between vent 202 and the fourth conduit 220. The fourth conduit 220 comprises auxiliary means 240 for bringing sulphur dioxide gas in the vent conduit and substantially all the water in a supplemental water conduit 294 into contained, codirectional flow whereby remaining sulphur dioxide gas and water are brought into contact with each other.

Figure 6:
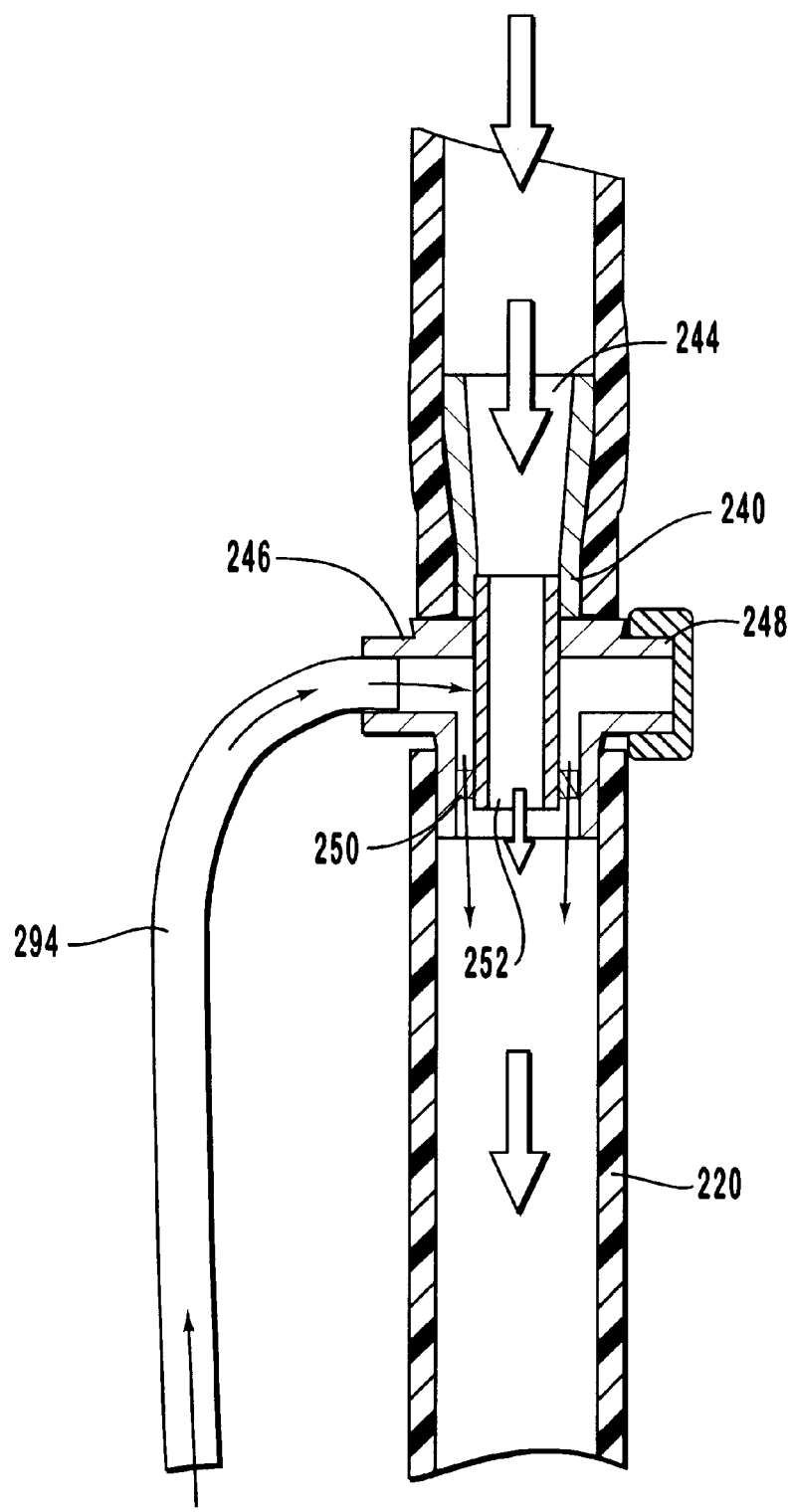
FIG. 6 is an enlarged view of a portion of a fourth conduit.

As shown in FIGS. 2, 3 and 6, the auxiliary means has a body 240 defining a gas entry 244, a gas outlet 252, a supplemental water conduit inlet 246, and water eductor 250.

Water enters the auxiliary means 240 through the supplemental water conduit 294 at inlet 246. The water courses through inlet 246 and eductor 250 as discussed earlier as to the codirectional means. Water eductor 250 draws any free floating sulphur dioxide gas into the exhaust vent conduit 210. Water and sulphur dioxide gas are brought into contact with each other in fourth conduit 220 by surrounding the gas exiting gas outlet 262 with water exiting eductor 250. The water and gas are contained in contact with each other as the gas and water flow down through fourth conduit 220 to react and form an acid of sulphur. This contact containment area does not obstruct the flow of the sulphur dioxide gas. It is believed that substantially all of the remaining sulphur dioxide gas in vent conduit 210 reacts with the water in this contact containment area.

In fourth conduit 220, the water/acid and unreacted or undissolved sulphur dioxide gas also experience one or more agitation and mixing episodes. For example, as fluid and gas divert in fourth conduit 220 at elbow 262, the flow of water/acid and sulphur dioxide gas is mixed and agitated. The water/acid and sulphur dioxide gas are again contained in contact with each other thereafter. As a result, like the water/acid and sulphur dioxide gas in the third conduit 76, the water/acid and sulphur dioxide gas in fourth conduit 220 may be subject to one or more contact containment portions and on or move agitation and mixing portions. The fourth conduit may have a u-trap 267. U-trap 267 acts as means to cause bubbles of unabsorbed diatomic nitrogen gas or undissolved sulphur dioxide, if any, to be held or trapped on the upstream side of u-trap 267 in a submersion zone. Secondary discharge 264 may also be configured with a vent stack 265. Remaining diatomic nitrogen gas in the system is permitted to escape the system through vent stack 265. Operation of the system reveals that little, if any, sulphur dioxide escapes the system. It is believed that gas that is escaping the system is harmless diatomic nitrogen. This configuration of a sulphur acid generator eliminates the dependence upon use of a countercurrent absorption tower technology of the prior art to effect production of sulphurous acid. Nevertheless, as an added safety feature to, and to further diminish any possible sulphur smell emitting from a device, vent stack 265 may comprise a limited exhaust scrubbing tower.

Figure 7:
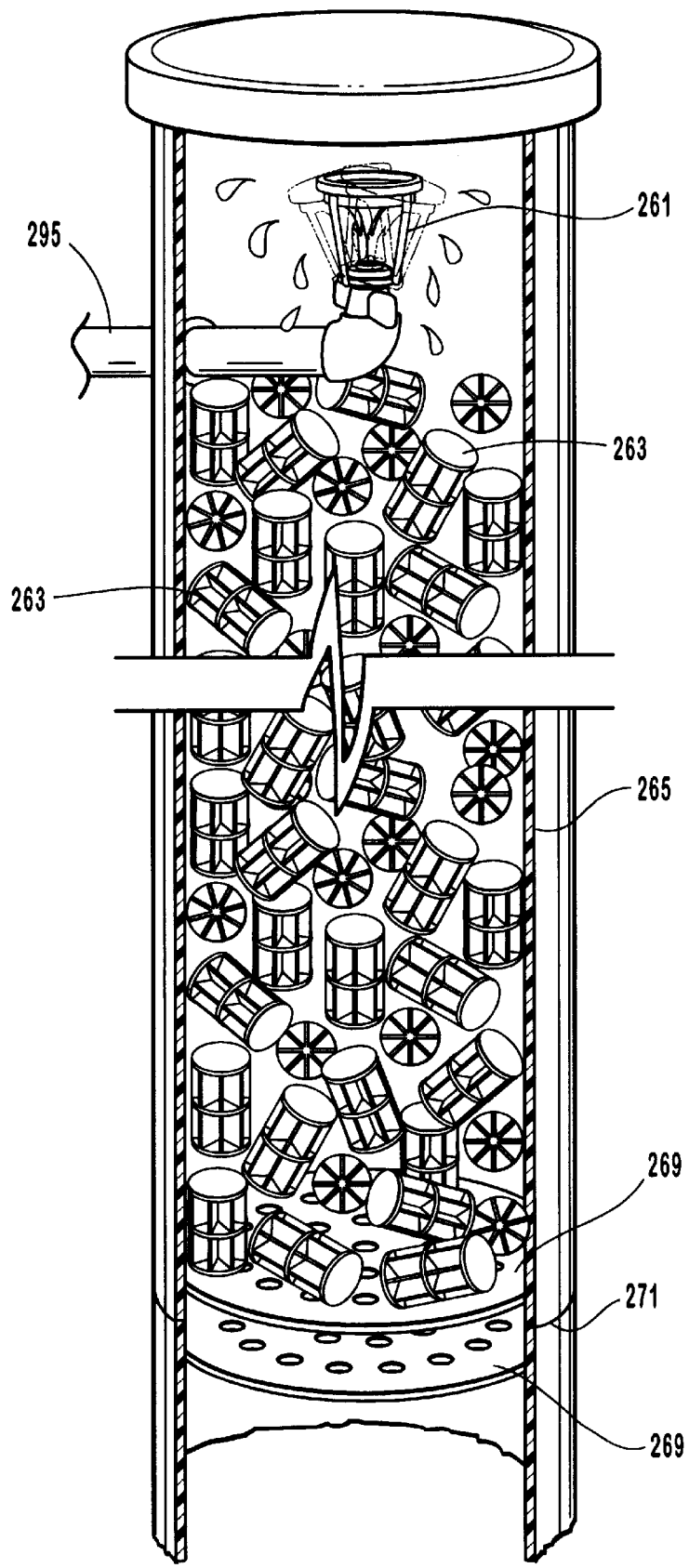
FIG. 7 is a cross-sectional view of the exhaust scrubbing tower.
Figure 9:
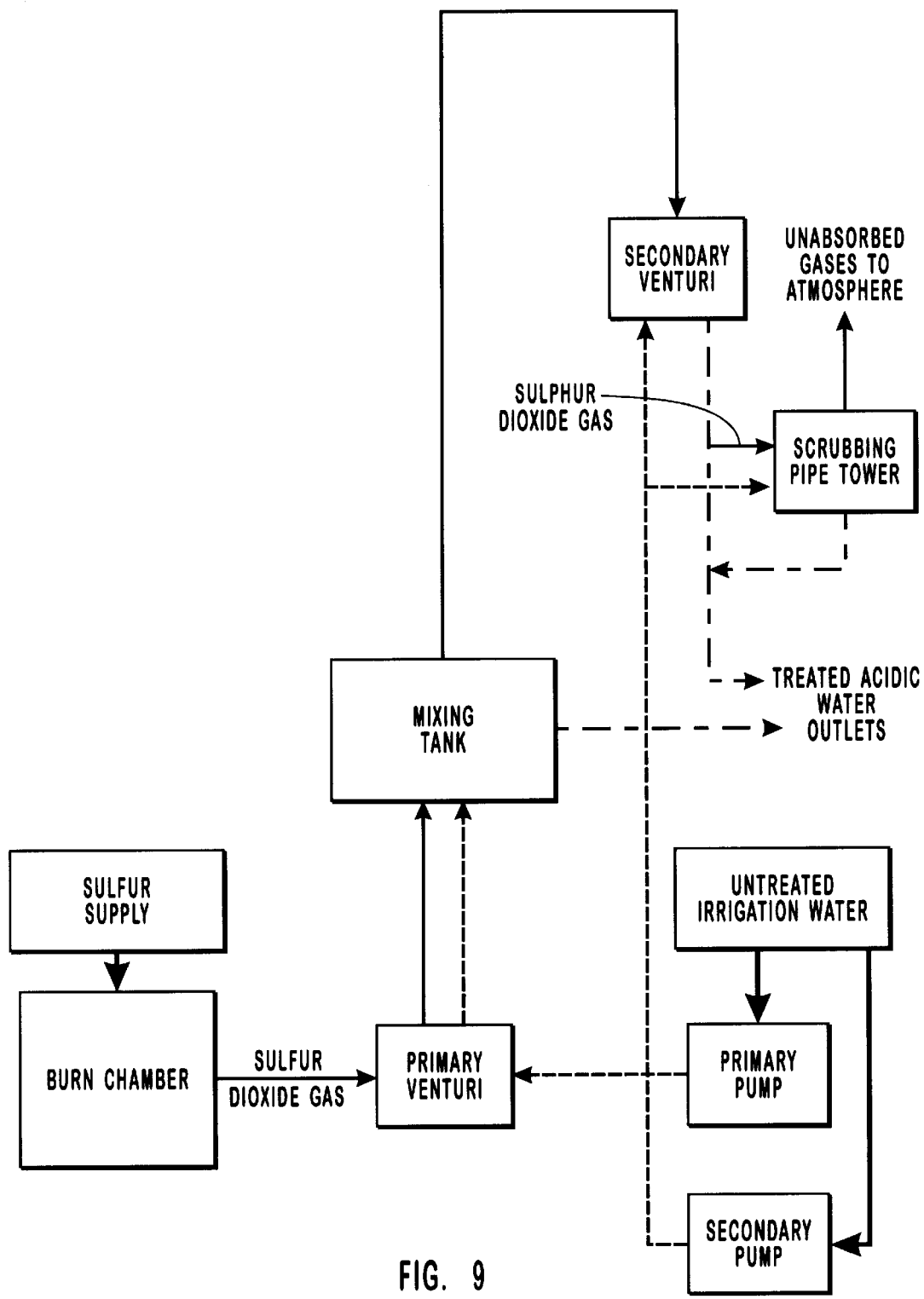
FIG. 9 is a flow chart explaining the inventive process.

As shown in FIGS. 2, 3, and 7, vent stack 65 encases two substantially horizontally placed vent screens 269. In the preferred environment, vent stack 265 is severable and connectable at joint 271. This facilitates construction shipment and maintenance. The upper vent screen 269 acts to contain path diverters 263 within vent stack 265. The source of water 295 is disposed to enter vent stack 265 at or near the top of vent stack 265. A water dispersion device 261 is attached to the end of water conduit 295 inside vent stack 265 above the column of path diverters 263. The preferred water dispersion device 261 is an i-Mini Wobbler distributed by Senninger Irrigation, Inc., Orlando, Fla., 32835, United States of America. In the present invention the water dispersion device 261 is, contrary to its intended use, inverted 180°. Experimentation has shown that the i-Mini Wobbler is the most effective in an inverted fashion because it duplicates rain in large droplets rather than a mist or spray and due to the wobbling affect of the device, it creates a randomly dispersed water flow thereby more effectively wetting the column of path diverters 263. This creates a water saturated tortuous path through which any undissolved gases trapped by u-trap 267 and venting out of discharge 264 must filter. In the preferred embodiment, the path diverters 263 are Flexirings® diverters 263. In this configuration, the only countercurrent flow of water and any undissolved gases is in the exhaust scrubbing tower of vent stack 265. Experimentation has shown that the majority of water entering the system of the present invention enters at inlet 106. A lesser amount of water enters the system at inlet 246 with only a fraction of the water entering the system through conduit 295. The flow of sulphur dioxide gas and water through the apparatus/system is depicted in flow diagram FIG. 9.

FIGS. 1, 2 and 3 show a primary pump 280 supplying water through a primary hose 282 to the secondary conduit water inlet 106 at codirectional means 100. In FIG. 2, a supplemental or secondary pump 290 supplies water to auxiliary means 240 through a supplemental water conduit hose 294 and to conduit 295. It will be appreciated that any pump capable of delivering sufficient water to the system may be utilized and the pump may be powered by any source sufficient to run the pump. A single pump with the appropriate valving may be used or several pumps may be used. It is also contemplated that no pump is necessary at all if an elevated water tank is employed to provide sufficient water flow to the system or if present water systems provide sufficient water pressure and flow.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A sulphurous acid generator apparatus comprising:
    a first conduit for conducting sulphur dioxide gas and means for drawing the sulphur dioxide gas through the first conduit;
    a second conduit for conducting water;
    a third conduit comprising:
        a blending portion and at least one contact containment portion,
            the blending portion comprising means for bringing the sulphur dioxide gas conducted through the first conduit and the water conducted through the second conduit into contained, codirectional flow whereby the sulphur dioxide gas and water are brought into contact with each other,
            the contact containment portion(s) comprising a passageway through which the sulphur dioxide gas and the water may codirectionally flow in contact with each other and in which at least a portion of the sulphur dioxide gas may react with water to form sulphurous acid,
        means for discharging the sulphurous acid and unreacted sulphur dioxide gas from the third conduit,
    the first and third conduits defining an open system thereby avoiding subjecting the sulphur dioxide gas to a system pressure;
    a mixing tank for further maintaining sulphur dioxide in contact with system fluid;
    primary means for discharging the sulphurous acid, the means for discharging having a submersion zone to substantially trap undissolved gases from passing from the apparatus with the flow of discharged fluid;
    the mixing tank defining an outlet through which the sulphurous acid may pass to exit the mixing tank, the mixing tank having a lid with an exhaust vent through which undissolved gases may exit the mixing tank;
    a vent conduit in communication with the exhaust vent and means for drawing the sulphur dioxide gas through the vent conduit;
    a supplemental water conduit for conducting a supply of water;
    a fourth conduit comprising:
        a blending portion and at least one contact containment portion;
            the blending portion comprising means for bringing the sulphur dioxide gas conducted through the vent conduit and the water conducted in the supplemental water conduit into contained, codirectional flow whereby the sulphur dioxide gas and water are brought into contact with each other,
            the contact containment portion(s) comprising a passageway through which the sulphur dioxide gas and the water may codirectionally flow in contact with each other and in which at least a portion of the sulphur dioxide gas may react with the water to form sulphurous acid,
        secondary means for discharging sulphurous acid, the means for discharging having a submersion zone to substantially trap undissolved gases from passing from the system with the flow of discharged fluid.

2. The apparatus of claim 1 further comprising a vent stack in communication with the secondary means for discharging sulphurous acid, the vent stack comprising a tower containing water and exhausting gases in countercurrent flow.

3. The apparatus of claim 1 wherein further comprising a corresponding hopper and burn chamber connected to the first conduit, the hopper and burn chamber constructed from a concrete comprising one part Lumnite® cement and three parts aggregate wherein the aggregate comprises pea-sized medium shale in an amount ranging from about 0 parts to about 3 parts and crushed/fine shale in an amount ranging from about 0 parts to about 3 parts.

4. The apparatus of claim 1 further comprising a burn chamber connected to the first conduit and means for dampening the flow of air into the burn chamber.

5. A sulphurous acid generator apparatus comprising:
    a first conduit for conducting sulphur dioxide gas and means for drawing the sulphur dioxide gas through the first conduit;
    a second conduit for conducting water;
    a third conduit comprising:
        a blending portion and at least one contact containment portion,
            the blending portion comprising means for bringing the sulphur dioxide gas conducted through the first conduit and the water conducted through the second conduit into contained, codirectional flow whereby the sulphur dioxide gas and water are brought into contact with each other,
            the contact containment portion(s) comprising a passageway through which the sulphur dioxide gas and the water may codirectionally flow in contact with each other and in which at least a portion of the sulphur dioxide gas may react with water to form sulphurous acid, means for discharging the sulphurous acid and unreacted sulphur dioxide gas from the third conduit, the first and third conduits defining an open system thereby avoiding subjecting the sulphur dioxide gas to a system pressure;

a mixing tank for further maintaining sulphur dioxide in contact with system fluid;

primary means for discharging the sulphurous acid;

the mixing tank defining an outlet through which the sulphurous acid may pass to exit the mixing tank, the mixing tank having a lid with an exhaust vent trough which undissolved gases may exit the mixing tank;

a vent conduit in communication with the exhaust vent and means for drawing the sulphur dioxide gas through the vent conduit;

a supplemental water conduit for conducting a supply of water;

a fourth conduit comprising:
  a blending portion and at least one contact containment portion;
    the blending portion comprising means for bringing the sulphur dioxide gas conducted through the vent conduit and the water conducted in the supplemental water conduit into contained, codirectional flow whereby the sulphur dioxide gas and water are brought into contact with each other,
    the contact containment portion(s) comprising a passageway through which the sulphur dioxide gas and the water may codirectionally flow in contact with each other and in which at least a portion of the sulphur dioxide gas may react with the water to form sulphurous acid, secondary means for discharging sulphurous acid.

6. The apparatus of claim 5 further comprising a vent stack in communication with the secondary means for discharging sulphurous acid, the vent stack comprising a tower containing water and exhausting gases in countercurrent flow.

7. The apparatus of claim 5 wherein further comprising a corresponding hopper and burn chamber connected to the first conduit, the hopper and burn chamber constructed from a concrete comprising one part Lumnite® cement and three parts aggregate wherein the aggregate comprises pea-sized medium shale in an amount ranging from about 0 parts to about 3 parts and crushed/fine shale in an amount ranging from about 0 parts to about 3 parts.

8. The apparatus of claim 5 further comprising a burn chamber connected to the first conduit and means for dampening the flow of air into the burn chamber.

* * * * *

(12) EX PARTE REEXAMINATION CERTIFICATE (5634th)
United States Patent
Jackson

(10) Number: US 6,506,347 C1
(45) Certificate Issued: Dec. 12, 2006

(54) OPEN SYSTEM SULPHUROUS ACID GENERATOR

(75) Inventor: Edward W. Jackson, Salt Lake City, UT (US)

(73) Assignee: AAPA Trust, Edward F. Bates, Trustee, Salt Lake City, UT (US)

Reexamination Request:
No. 90/006,902, Jan. 8, 2004

Reexamination Certificate for:
Patent No.: 6,506,347
Issued: Jan. 14, 2003
Appl. No.: 09/643,097
Filed: Aug. 21, 2000

Related U.S. Application Data

(63) Continuation-in-part of application No. 08/888,376, filed on Jul. 7, 1997, now Pat. No. 6,248,299.

(51) Int. Cl.
*C01B 17/48* (2006.01)
*B32B 9/04* (2006.01)
*B32B 5/02* (2006.01)
*B32B 27/42* (2006.01)

(52) U.S. Cl. .................. 422/161; 422/160; 422/169; 422/172; 422/189; 423/522

(58) Field of Classification Search ................ 422/161, 422/160, 169, 172, 189; 423/522
See application file for complete search history.

(56) References Cited

U.S. PATENT DOCUMENTS 270,763 A * 1/1883 Dotterer .................. 422/161
2,416,700 A * 3/1947 Kocher .................... 501/124

OTHER PUBLICATIONS

Harmon SO2 Generator brochure, date unknown.*

* cited by examiner

*Primary Examiner*—Jerry D. Johnson

(57) ABSTRACT

This invention presents a sulphurous acid generator which employs a combination of novel blending, contact and mixing mechanisms which maximize the efficiency and duration of contact between sulphur dioxide gas and water to form sulphurous acid in an open nonpressurized system, without employing a countercurrent absorption tower. The present invention also incorporates a novel high temperature concrete for use in constructing portions of the present invention.

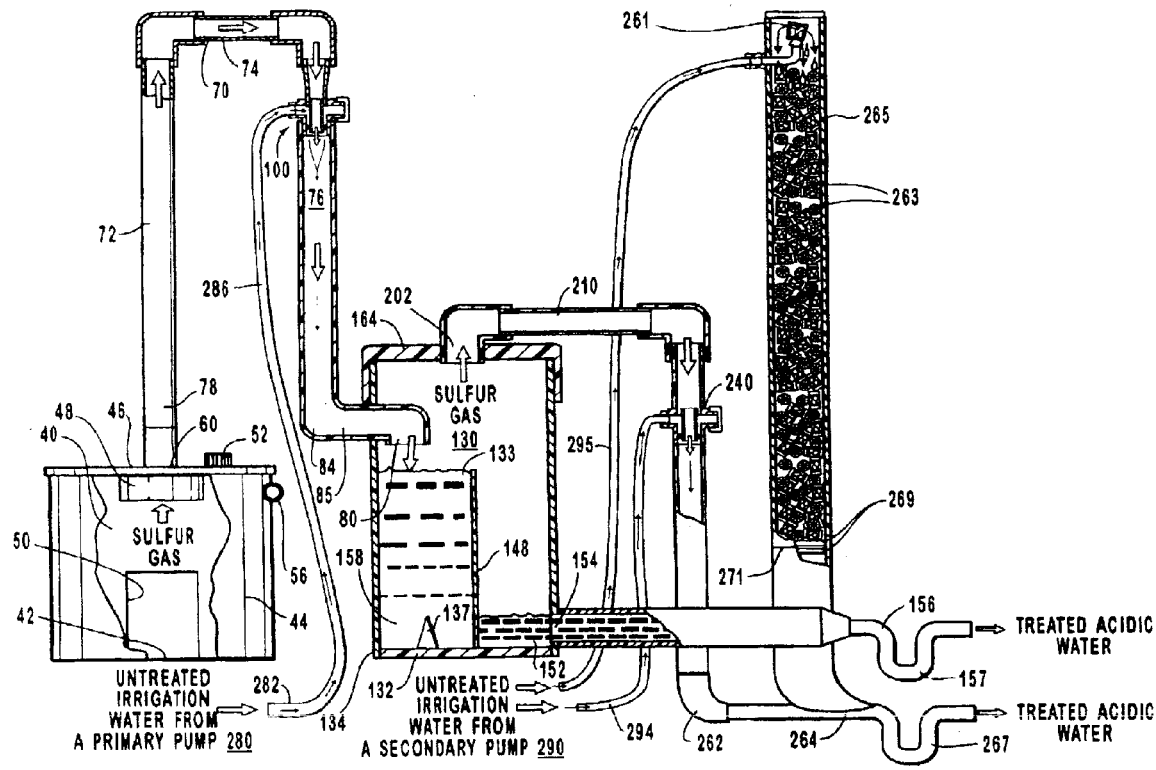

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–8 is confirmed.

* * * * *